United States Patent [19]

Pride, III et al.

[11] Patent Number: 5,524,120
[45] Date of Patent: Jun. 4, 1996

[54] DIGITAL LOW POWER SYMBOL RATE DETECTOR

[75] Inventors: Joseph P. Pride, III, Elk Grove; Stanley A. White, San Clemente, both of Calif.

[73] Assignee: Rockwell International Corporation, Seal Beach, Calif.

[21] Appl. No.: 270,559

[22] Filed: Jul. 5, 1994

[51] Int. Cl.[6] .................................................. H04B 3/46
[52] U.S. Cl. .......................... 375/225; 375/261; 375/326; 375/328; 375/355; 375/377; 370/17; 329/310; 364/725; 327/13; 327/47
[58] Field of Search ................................. 375/224, 225, 375/261, 324–328, 344, 349, 350, 355, 377; 364/725; 370/17, 84, 108; 329/304–310; 455/226.1; 327/39, 40, 47, 63, 13

[56] References Cited

U.S. PATENT DOCUMENTS

| | | | |
|---|---|---|---|
| 4,747,114 | 5/1988 | Martinez | 375/345 |
| 5,170,415 | 12/1992 | Yoshida et al. | 375/324 |
| 5,455,847 | 10/1995 | Guilford et al. | 375/326 |

*Primary Examiner*—Stephen Chin
*Assistant Examiner*—Amanda T. Le
*Attorney, Agent, or Firm*—George A. Montanye; Charles T. Silberberg; Tom Streeter

[57] ABSTRACT

This detector provides a computationally simple digital low power detector of symbol rate, also called baud rate. It uses an approximate Hilbert transform function to create approximate in-phase and quadrature signals. An approximate envelope detector (feature extractor) processes these signals to produce a signal with a strong frequency component at the symbol rate. This signal is then filtered, accumulated, and threshold detected. The approximate in-phase and quadrature signals are formed by a linear sequence of six delay elements, the output of the third delay element being the in-phase signal. A first summer receives the output of the second delay element at a minus input and the output of the fourth delay element at a plus input. A second summer receives the signal input at a minus input and the output of the sixth delay element at a plus input, and drives a right two bit shifter. A third summer receives the output of the right two bit shifter and the output of the first summer and drives both a right one bit shifter and a right three bit shifter, the outputs of which are summed to form the quadrature signal.

5 Claims, 4 Drawing Sheets

5,524,120

DIGITAL LOW POWER SYMBOL RATE DETECTOR

BACKGROUND OF THE INVENTION

This invention relates to communications and to signal processing of digitally modulated signals. It has particular reference to timing recovery in demodulation systems, type recognition for both commercial and military applications, and signal detection, especially as a chip rate detector for wide band signal detection.

Many of the applications referred to above require simple, low power, low cost implementations. However, traditional digital solutions to this problem require significant computation. This translates directly to increased size, cost, and power requirements.

SUMMARY OF THE INVENTION

The present invention overcomes these problems by providing a computationally simple digital low power detector of symbol rate, also called baud rate. It uses an approximate Hilbert transform function to create approximate in-phase and quadrature signals. An approximate envelope detector (feature extractor) processes these signals to produce a signal with a strong frequency component at the symbol rate. This signal is then filtered, accumulated, and threshold detected.

The approximate in-phase and quadrature signals are formed by a linear sequence of six delay elements, the output of the third delay element being the in-phase signal. A first summer receives the output of the second delay element at a minus input and the output of the fourth delay element at a plus input. A second summer receives the signal input at a minus input and the output of the sixth delay element at a plus input, and drives a right two bit shifter. A third summer receives the output of the right two bit shifter and the output the first summer and drives both a right one bit shifter and a right three bit shifter, the outputs of which are summed to approximate the quadrature signal.

DETAILED DESCRIPTION OF THE DRAWINGS
Block Overview

Figure 1:
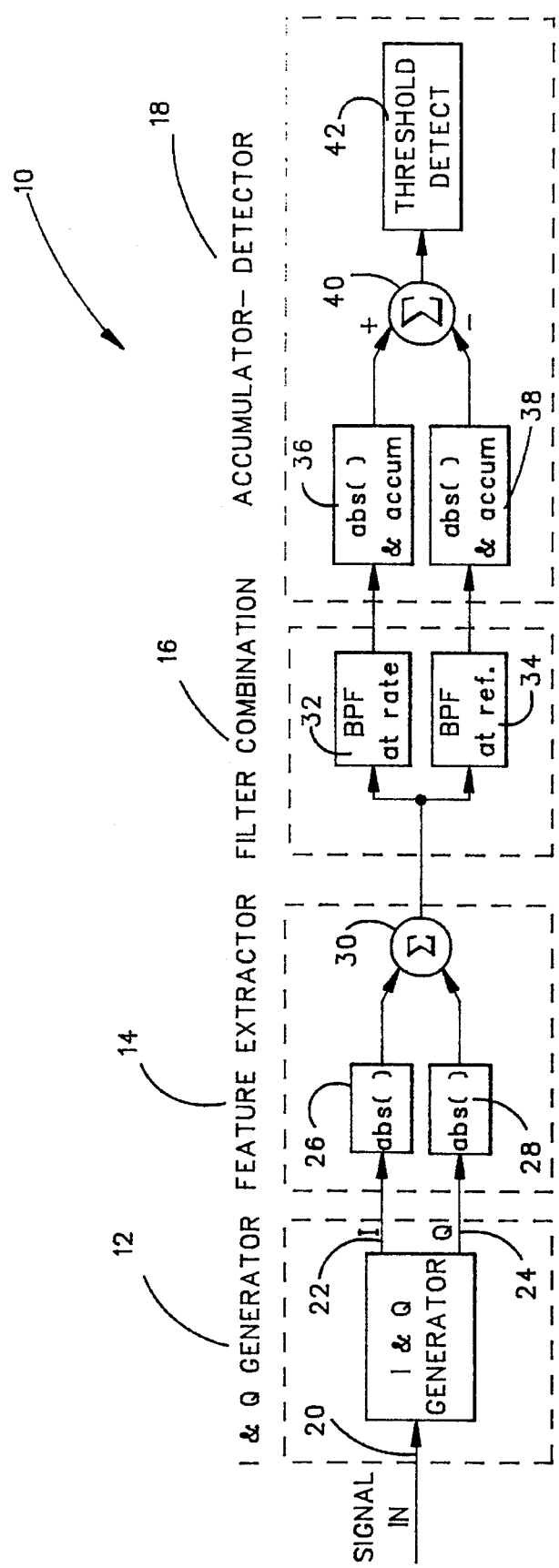
FIG. 1 is block overview of the present invention.

In FIG. 1 (a block overview of the present invention), a symbol rate detector 10 has an in-phase and quadrature (I&Q) generator 12, a feature extractor 14, a filter combination 16, and an accumulator-detector 18.

Figure 2:
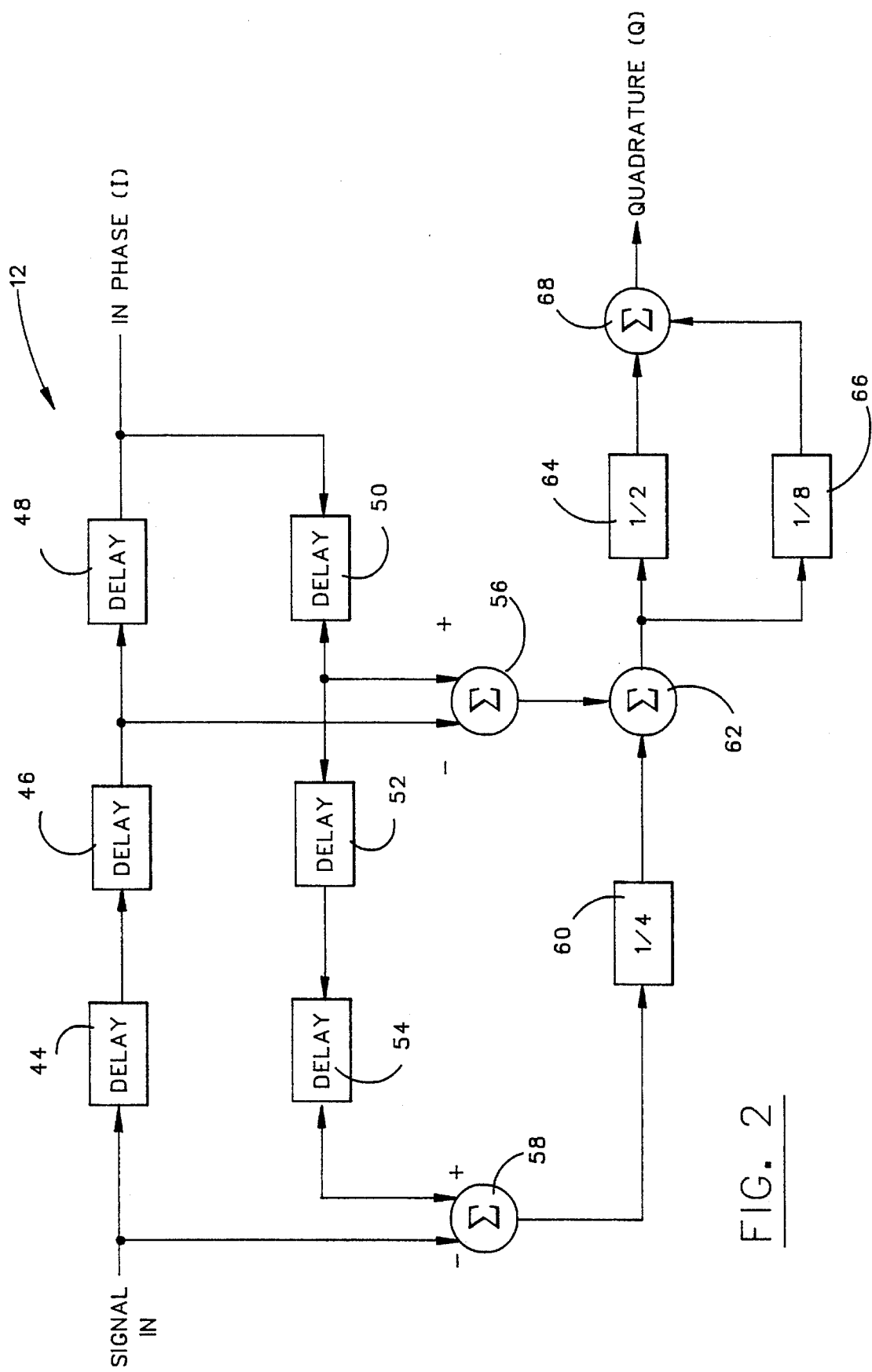
FIG. 2 is a more detailed view of the in-phase and quadrature signal generator of FIG. 1.

The I&Q generator 12 includes a signal input 20 (which receives input signals to the symbol rate detector 10), an in-phase signal output 22, and a quadrature signal output 24. The details of the I&Q generator are shown in FIG. 2.

The feature extractor 14 includes, in the preferred embodiment, a first means 26, connected to the in-phase signal output 22, for taking the absolute value of the in-phase signal. It also includes a second means 28, connected to the quadrature signal output 24, for taking the absolute value of the quadrature signal. The outputs of the first and second means are summed in a summer 30.

The filter combination 16 includes a first band pass filter 32 centered at the timing frequency and a second band pass filter 34 centered at a reference frequency adjacent to the timing frequency. Each band pass filter 32, 34 receives the output of the summer 30, and each band pass filter 32, 34 delivers its output to the accumulator-detector 18.

The accumulator-detector 18 includes a timing absolute-accumulator means 36, receiving the output of the first band pass filter 32, and a reference absolute-accumulator means 38, receiving the output of the second band pass filter 34. Each of these absolute-accumulator means 36, 38 includes a means for taking the absolute values of its input signals, and for accumulating these respective absolute values. The difference between the respective accumulated absolute values is determined by a differencer 40, which in turn drives a threshold detector 42. The output of the threshold detector 42 is the output of the symbol rate detector 10.

Details of the I&Q Generator

FIG. 2 is a more detailed view of the in-phase and quadrature signal generator 12 of FIG. 1. The input signal drives a linear sequence of six delay elements 44, 46, 48, 50, 52, and 54. The output of the third delay element 48 is the in-phase signal. A first summer 56 receives the output of the second delay element 46 at a minus input and the output of the fourth delay element 50 at a plus input. A second summer 58 receives the signal input at a minus input and the output of the sixth delay element 54 at a plus input. The second summer 58 drives a right two bit shifter 60, shown as a box around "¼" since the effect is to divide by four. A third summer 62 receives the output of the right two bit shifter 60 and the output of the first summer 56. The third summer 62 drives both a right one bit shifter 64 (box with "½") and a right three bit shifter 66 (box with "⅛"), the outputs of which are summed on a fourth summer 68 to approximate the quadrature signal.

Other Embodiments of the Feature Extractor

The feature extractor 14 shown in FIG. 1 is the preferred embodiment. Other embodiments are shown in FIGS. 3–5.

Figure 3:
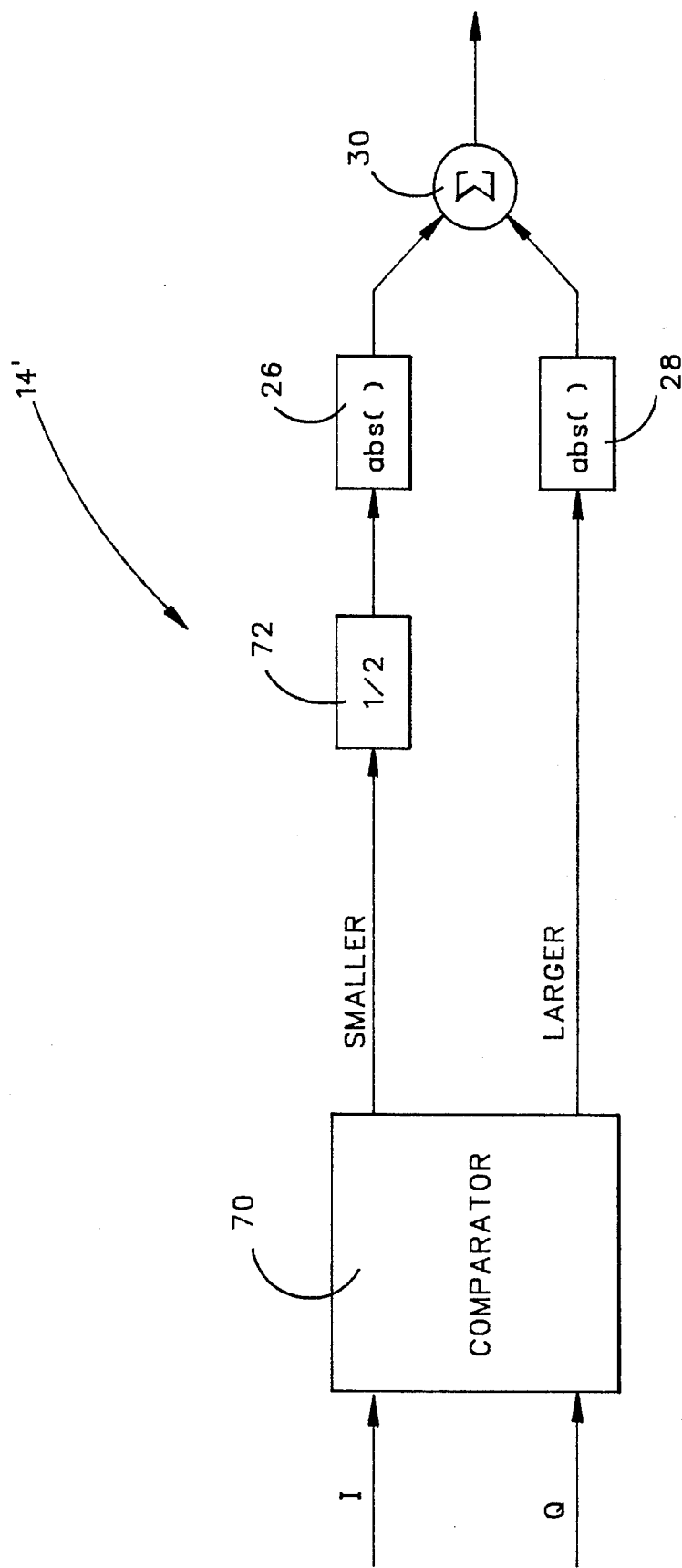
FIGS. 3–5 show alternate embodiments of the feature extractor shown in a preferred embodiment in FIG. 1.

In FIG. 3, a first alternate feature extractor 14' is shown. In it, the I and Q signals do not drive the absolute value means 26 and 28 directly. Instead, they drive a comparator 70, which determines which of the signals is larger. The comparator 70 routes that larger signal directly to one of the absolute value means, shown in FIG. 3 as means 28. The smaller signal is first directed to a one bit right shifter 72, the output of which is applied to the other absolute value means, shown in FIG. 3 as 26. The remainder of FIG. 3's first alternate feature extractor 14' is the same as FIG. 1's preferred feature extractor 14.

Figure 4:
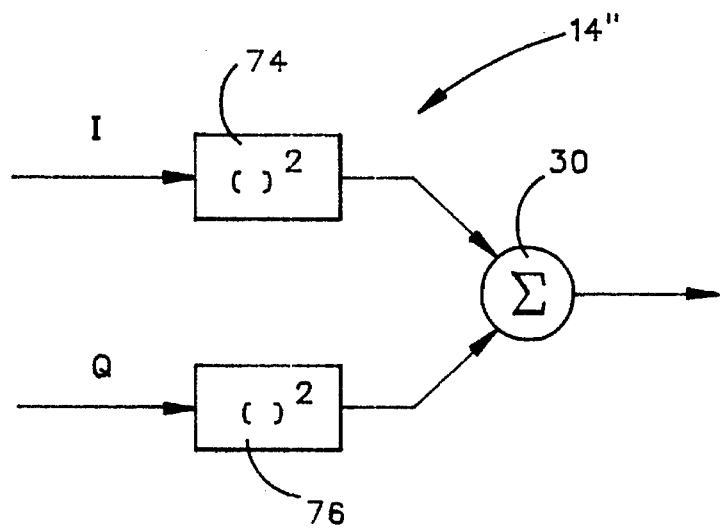

In FIG. 4, a second alternate feature extractor 14" is shown. In it, the I and Q signals do not drive the absolute value means 26 and 28, but instead drive squaring means 74 and 76. The remainder of FIG. 4's second alternate feature extractor 14" is the same as FIG. 1's preferred feature extractor 14.

Figure 5:
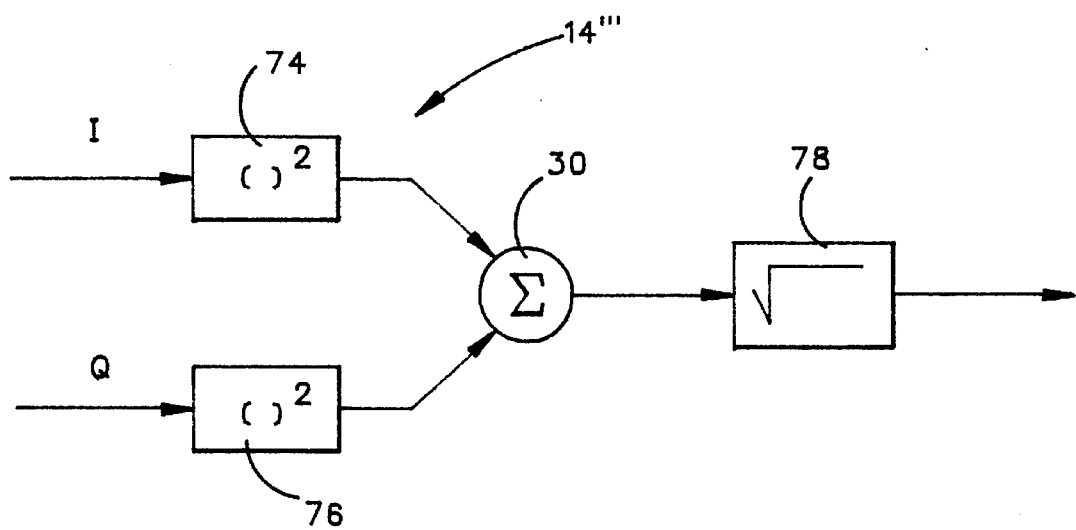

In FIG. 5, a third alternate feature extractor 14'" is shown. It is the same as that shown in FIG. 4, except that a square root extractor 78 is driven by the summer 30. It is the output of the square root extractor 78 which is passed on to the filter combination 16, rather than the output of the summer 30 being passed on directly.

Scope of the Invention

Several embodiments of the present invention have been shown, but the true spirit and scope of the present invention are not limited thereto. Instead, such spirit and scope are limited only by the appended claims, and their equivalents.

What is claimed is:

1. A symbol rate detector comprising:
   (a) an in-phase and quadrature signal generator comprising:
      (1) a signal input driving a linear sequence of six delay elements, an output of the third delay element being the in-phase signal;
      (2) a first summer receiving an output of the second delay element at a minus input and an output of the fourth delay element at a plus input;
      (3) a second summer receiving the signal input at a minus input and an output of the sixth delay element at a plus input;
      (4) a right two bit shifter receiving an output of the second summer;
      (5) a third summer receiving an output of the right two bit shifter and an output of the first summer;
      (6) a right one bit shifter receiving an output of the third summer;
      (7) a right three bit shifter receiving the output of the third summer; and
      (8) a fourth summer receiving an output of the right one bit shifter and an output of the right three bit shifter, an output of the fourth summer being the quadrature signal;
   (b) a feature extractor for enhancing and extracting a timing envelope, the extractor receiving the in-phase signal and the quadrature signal;
   (c) a filter combination comprising:
      (1) a band pass filter centered at a timing frequency and receiving an output of the extractor; and
      (2) a band pass filter centered at a reference frequency adjacent to the timing frequency and receiving the output of the extractor; and
   (d) an accumulator-detector comprising:
      (1) a timing absolute-accumulator means for taking absolute values of an output of the timing frequency filter and for accumulating the timing frequency absolute values;
      (2) a reference absolute-accumulator means for taking absolute values of an output of the reference frequency filter and for accumulating the reference frequency absolute values;
      (3) a differencing means for taking the difference between an output of the timing absolute-accumulator means and an output of the reference absolute-accumulator means; and
      (4) a threshold detector receiving an output of the differencing means, an output of the threshold detector being an output of the rate detector.

2. The symbol rate detector of claim 1, wherein the feature extractor comprises:
   (a) a first means for taking the absolute value of the in-phase signal;
   (b) a second means for taking the absolute value of the quadrature signal; and
   (c) a summer receiving an output of the first means and the second means, an output of the summer being the output of the feature extractor.

3. The symbol rate detector of claim 2, further comprising:
   (a) a comparator for comparing the output of the first means with the output of the second means and for determining which output is the smaller output; and
   (b) a one bit right shifter connected between the smaller output and the summer.

4. The symbol rate detector of claim 1, wherein the feature extractor comprises a means for taking the sum of the squares of the in phase signal and the quadrature signal.

5. The symbol rate detector of claim 1, wherein the feature extractor comprises a means for taking the square root of the sum of the squares of the in phase signal and the quadrature signal.

* * * * *